A. BARBEE.
CAMERA ATTACHMENT.
APPLICATION FILED JUNE 13, 1917.
1,263,018.
Patented Apr. 16, 1918.
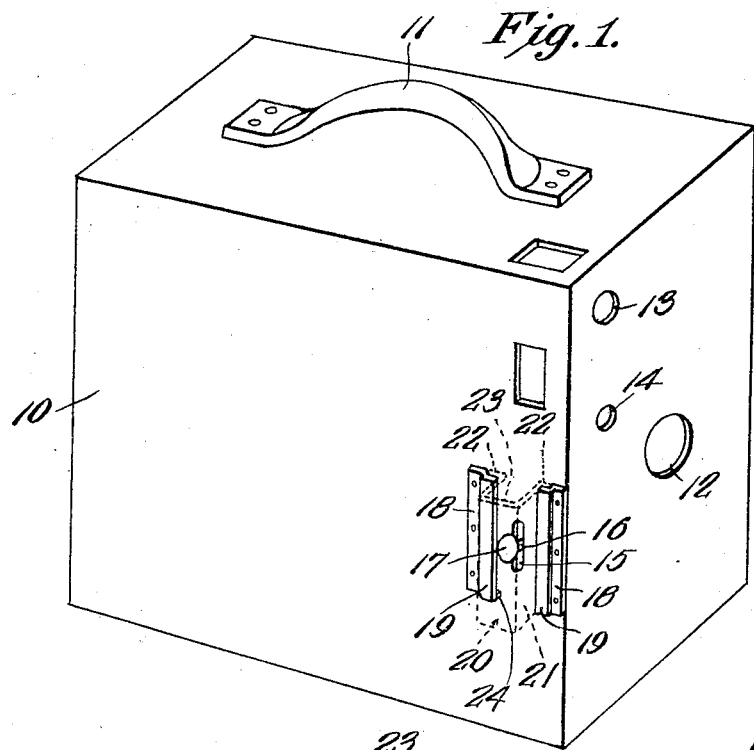
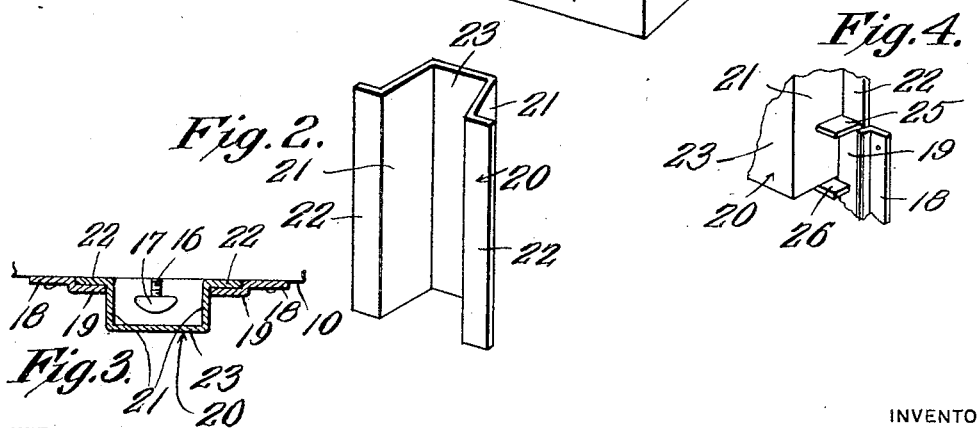
WITNESSES
James F Crown,
N. P. Hollingsworth
INVENTOR
Annie Barbee,
BY Richard Owen,
ATTORNEY

UNITED STATES PATENT OFFICE.

ANNIE BARBEE, OF SAN JUAN, CALIFORNIA.

CAMERA ATTACHMENT.

1,263,018.

Specification of Letters Patent.

Patented Apr. 16, 1918.

Application filed June 13, 1917. Serial No. 174,617.

*To all whom it may concern:*

Be it known that I, ANNIE BARBEE, a citizen of the United States, residing at San Juan, in the county of San Benito and State of California, have invented certain new and useful Improvements in Camera Attachments, of which the following is a specification.

This invention relates to a camera attachment, and has for its primary object to provide means for preventing the accidental tripping of the shutter when carrying a camera and so causing an exposure to be spoiled.

A number of cameras at the present day are mounted permanently within a rectangular case having an opening in one end opposite the lens and shutter, through one side of which case the trip lever for actuating the shutter projects and is liable to be struck by the body or clothing of a person or some other object and permitting the shutter to operate and expose the film to the light and thus spoil an exposure either previously made or to be made if the shutter was tripped unknown to the operator.

To protect the trip lever by a suitable covering, which may be readily removed when an exposure is to be made and which may be as readily returned in place over the trip lever is the primary object of the present invention, the parts of which it is formed being few and simple in construction and readily applied to any camera mounted in a casing through the side of which the trip lever projects.

With the above object in view, the invention consists in the novel construction, combination and arrangement of parts hereinafter described, pointed out in the appended claims and illustrated in the accompanying drawings, in which:

Figure 1 is a perspective view of a camera with the improvement attached, a portion of the same being shown in dotted lines, Fig. 2 is a perspective view of the covering member of the attachment separated from the camera.

Fig. 3 is a detail sectional view taken transversely of the attachment in position on the side of a camera.

Fig. 4 is a detail perspective view showing a modification.

Referring to the drawing, 10 indicates a camera case, in the present instance in the form of a rectangular box to one side of which is attached a carrying handle 11. At one end is a circular opening 12 back of which is placed the lens and the shutter, the same end being also provided near one corner with two other but smaller circular openings 13 and 14, used for focusing purposes, the same being common to substantially all cameras of this type now in use. At one side of the camera case 10 near the forward end or the end having the opening 12 therein is formed a slot 15 through which projects one end of the shutter tripping lever 16, the terminal of which is usually provided with a button or thumb piece of some sort as indicated at 17. As a rule, this tripping lever projects sufficiently far beyond the side wall of the casing to be operated by contact with the body or clothing when carrying the case and to prevent such accidents is the object of the present invention. To accomplish this purpose, there is riveted or screwed to the side of the casing on opposite sides of the trip lever 16, two guides 18 in parallel relation and spaced a short distance apart, the adjacent edges 19 of which guides are offset so as to leave a narrow channel between their inner faces and the side of the casing into which may be slipped a cover or protector 20 for the trip lever shown particularly in Fig. 2.

The cover 20, like the guides 18 is made of sheet metal, and bent into a U-shape in cross section, the edges of the sides 21 of the protector being bent to lie in the same plane forming flanges 22 that engage the channels formed by the offset portions 19 of the guides 18. The length of the protector 20 is sufficient to extend well above and below the trip lever 16 so it cannot under any conditions be accidentally operated, while the sides 21 are of such width that the outer face or end 23 will be sufficiently far from the button 17 to permit the insertion and withdrawal of the protector 20 without danger of engaging the button and operating the trip. Preferably, the sides 21 of the protector incline outwardly at their free ends as shown in Fig. 2 so as to exert a slight pressure when placed in position, and thus by means of the resiliency of its sides, the protector is prevented from falling out of the guides 18. If desired, the lower ends of the offset portions 19 of the guides may be turned inwardly as at 24 by means of which all danger of the protector slipping downwardly and out of position is prevented. As a further modification, one of the guides 18 may have a lug 25 extending outwardly from its upper end to engage a lug 26 on the lower end of the protector 20 which, while permitting the full movement of the protector upwardly to expose the trip lever will prevent said protector from being withdrawn; or the position of these lugs may be reversed so that the protector 20 may be pushed downwardly as far as the bottom of the guides 18, but owing to the engagement of the lugs absolute removal of the protector is prevented.

I claim:—

1. The combination with a camera having a shutter trip lever, of an attachment comprising a removable cover frictionally held in place over said trip lever to prevent accidental operation of the same.

2. The combination with a camera having a shutter trip lever, of an attachment comprising a sliding protector for the said trip lever to prevent accidental operation of the same.

3. The combination with a camera having a shutter trip lever, of an attachment comprising a pair of guides, and a protecting cover slidable therein to engage over said shutter trip lever and prevent accidental operation of the same.

4. The combination with a camera having a shutter operating lever projecting through the casing of said camera, of an attachment comprising a protecting member U-shaped in cross section removably mounted on the camera casing and frictionally held in place over said shutter operating lever to prevent accidental operation of the same.

5. The combination with a camera having a shutter trip lever projecting through the casing thereof, of an attachment comprising a pair of guide members mounted in parallel relation upon the camera casing on opposite sides of said shutter trip lever, and a protecting member adapted to be removably mounted in said guides and overlie said operating lever.

6. The combination with a camera having the shutter operating lever projecting through the casing thereof, of an attachment comprising guides secured to the casing on opposite sides of the shutter operating lever and parallel to each other, channel ways being formed in said guides adjacent the casing, and a protecting member for said operating lever having flanges adapted to engage said guides and be held therein over said operating lever to prevent accidental movement of the same.

In testimony whereof I affix my signature in presence of two witnesses.

ANNIE BARBEE.

Witnesses:
LAURENCE OTTOBAIN,
E. A. PEARCE.

Copies of this patent may be obtained for five cents each, by addressing the "Commissioner of Patents, Washington, D. C."